J. F. GODFREY.
CLUTCH MECHANISM.
APPLICATION FILED MAY 27, 1920.
1,429,280.
Patented Sept. 19, 1922.
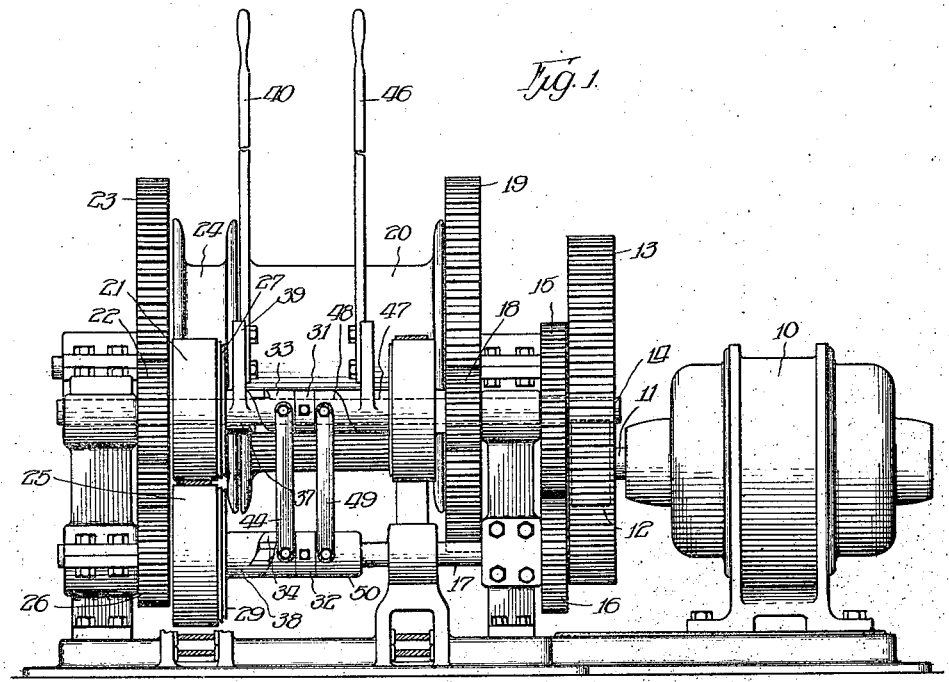
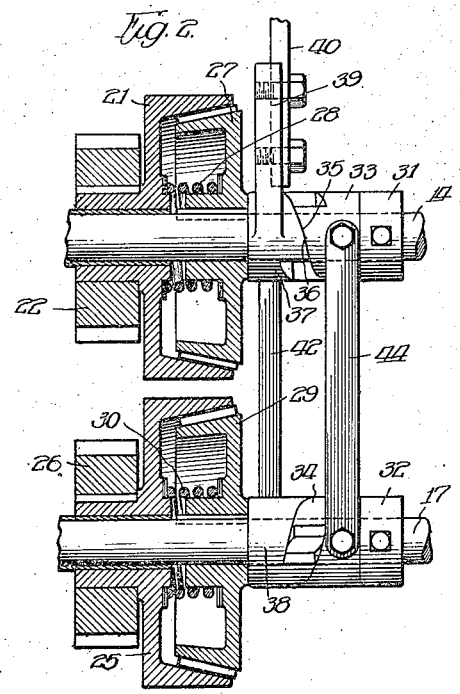
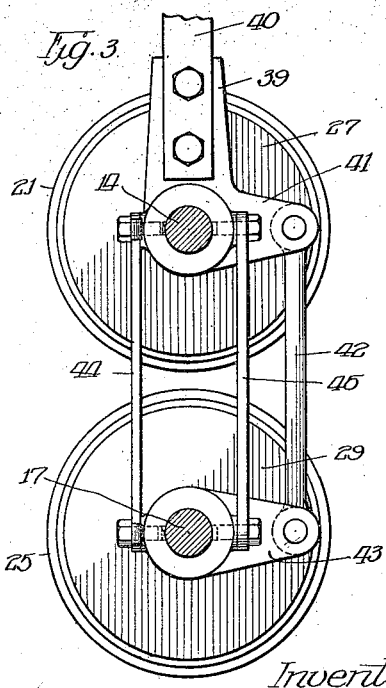
Witness:
G. Burkhardt.
Inventor:
John F. Godfrey,
By Wilkinson, Huxley, Byron & Knight
Attys.

Patented Sept. 19, 1922.

1,429,280

UNITED STATES PATENT OFFICE.

JOHN F. GODFREY, OF ELKHART, INDIANA, ASSIGNOR TO THE GODFREY CONVEYOR COMPANY, OF ELKHART, INDIANA, A CORPORATION OF INDIANA.

CLUTCH MECHANISM.

Application filed May 27, 1920. Serial No. 384,583.

*To all whom it may concern:*

Be it known that I, JOHN F. GODFREY, a citizen of the United States, residing at Elkhart, in the county of Elkhart and State of Indiana, have invented certain new and useful Improvements in Clutch Mechanism, of which the following is a specification.

This invention relates to clutch mechanism.

One object is to simplify and improve clutch mechanism in a manner to meet the various requirements for successful commercial operation.

Another object is to provide a novel and practical reversible clutch arrangement which is operated and controlled in a simple and efficient manner.

These and other objects are accomplished by means of the arrangement disclosed on the accompanying sheet of drawings, in which—

Figure 1 is a front elevation of a hoist embodying my invention;

Figure 2 is a detail view of my clutch control mechanism, parts being shown in section for the sake of clearness; and, Figure 3 is a side elevation of the arrangement shown in Figure 2.

The various novel features of my invention will be apparent from the following description and drawings and will be particularly pointed out in the appended claims.

Referring to the figures of the drawings, it will be noted that I have disclosed my invention in connection with a hoist operated by an electric motor 10, the shaft 11 of said motor having secured thereto a pinion 12 which meshes with and drives a relatively large gear 13 mounted on a shaft 14, which carries concentrically with the gear 13 a smaller gear 15, which meshes with and drives a gear 16 mounted upon one end of a shaft 17. Also mounted upon the shaft 14 is a gear 18, which meshes with a gear 19 for driving the latter, said gear 19 being operatively connected to a drum 20 around which a cable may be wound for hoisting purposes. Loosely mounted upon the shaft 14 near one end thereof is a clutch member 21, to which a gear 22 is keyed, said gear 22 meshing with a relatively large gear 23 operatively connected with a drum 24, around which a cable may be wound, said drum being positively operated in opposite directions by mechanism to be referred to hereinafter. Also loosely mounted upon the shaft 17 is another clutch member 25, to which is keyed a gear 26, also meshing with gear 23. It will be noted that in view of the fact that gears 15 and 16 are in mesh with each other, shafts 14 and 17 are caused to operate in opposite directions. Accordingly, the gears 22 and 26, respectively, drive the gear 23, and accordingly the drum 24, in opposite directions.

Referring particularly to Figure 2, it will be noted that the movable clutch member 27 is splined on the shaft 14 and normally is held out of engagement with its mating clutch member 21 by a coiled spring 28. Similarly, the movable clutch member 29 is splined upon shaft 17 and normally held out of engagement with its mating clutch member 25 by a coiled spring 30.

It will be noted that collars 31 and 32 are secured to the shafts 14 and 17, respectively, and rotate therewith. Abutment members 33 and 34 are loosely mounted upon the shafts 14 and 17, respectively, said abutment members having cam surfaces 35 to cooperate with cam surfaces 36 of clutch control members 37 and 38 mounted upon shafts 14 and 17, respectively, and located, respectively, between abutment member 33 and clutch member 27, and abutment member 34 and clutch member 29. The control member 37 has integrally formed therewith an arm 39, to which is secured a control lever 40. The control member 37 also has a second integrally formed arm 41, to which is pivotally connected one end of a link 42, the other end of which is pivotally connected to an arm 43 integrally formed on the clutch control member 38. It is apparent, therefore, that when the clutch control lever 40 is operated in one direction or the other, both of the clutch control members 37 and 38 will be operated, and it will be seen that as a result of the cam surfaces 35 and 36 on the members 33 and 37 mounted on shaft 14 and of the members 34 and 38 on shaft 17 being arranged in a reverse order with respect to each other, that when the clutch lever 40 is thrown in one direction one of the movable clutch members will be moved into operative engagement with its mating clutch member, and the other movable clutch member will be permitted to move out of operative engagement with its mating clutch member under the tension of its coil spring. In other words, by means of having the cam clutch control members 37 and 38 interconnected and operated by the single control lever 40, the movable clutch members will be moved simultaneously in opposite directions for throwing in one clutch and throwing out the other clutch, whereby the drum 24 may be driven in opposite or reverse directions for conveying a load in such opposite directions.

Unless some special provision were made, the abutment members 33 and 34 loosely mounted upon the shaft 14 and 17, respectively, would rotate on said shafts, preventing the proper functioning of the clutch control members 37 and 38. Accordingly, I have connected said cam abutment members 33 and 34 by oppositely arranged links 44 and 45, which hold said members 33 and 34 against rotation. It will be noted that said members 33 and 34 abut the collars 31 and 32, respectively, so that a movement of the control lever 40 causing a relative movement between the members 33 and 37 on one shaft and 34 and 38 on the other shaft causes or permits movement of the clutch members 27 and 29 in opposite directions.

A similar clutch arrangement is provided for operating the hoisting drum 20, there being provided a control lever 46 connected to a cam shaped clutch control member 47 having a cooperating abutment member 48 which is loosely mounted upon the shaft 14 and which is connected by two oppositely arranged links 49 to a sleeve 50 loosely mounted upon the shaft 17. The abutment member 48 also engages the collar 31 and the sleeve 50 engages the collar member 32. When the control lever 46 is thrown in one direction, it causes the operation of the hoist drum 20, and when operated in the opposite direction, the clutch is thrown out.

By means of this arrangement simple, efficient and improved clutch mechanism is provided which is adapted to meet all of the requirements for successful commercial operation.

It is my intention to cover all modifications of the invention falling within the spirit and scope of the following claims.

I claim:

1. In clutch mechanism, the combination of a plurality of shafts, clutch members and fixed collars carried by said shafts, abutment means loosely mounted on each of said shafts between said collars and clutch members and connected to each other to prevent rotation of said abutment means on said shafts, and clutch control means cooperating with said abutment means and clutch members for operating said clutch members.

2. In a clutch mechanism, the combination of a plurality of parallel shafts, clutch members driven by said shafts, collars fixed to said shafts, abutment members loosely mounted on said shafts between the collars and clutch members, links joining the two abutment members upon the adjacent shafts whereby the members are restrained from rotation, and clutch control means located between the clutch members and abutment members adapted to coact with the abutment members to operate the clutch members.

3. In a clutch mechanism, the combination of a plurality of parallel shafts, clutch members driven by said shafts, collars fixed to said shafts, cam abutment members loosely mounted on said shafts between the collars and clutch members, a plurality of links joining the two abutment members upon the adjacent shafts whereby the members are restrained from rotation, and cam clutch control means located between the clutch members and abutment members adapted to coact with the cam abutment members to operate the clutch members.

Signed at Chicago, Illinois, this 25th day of May, 1920.

JOHN F. GODFREY.